US012322276B2

(12) United States Patent
Teixeira et al.

(10) Patent No.: US 12,322,276 B2
(45) Date of Patent: Jun. 3, 2025

(54) HAPTIC NOTIFICATION SYSTEM AND METHOD

(71) Applicant: T-Mobile Innovations LLC, Overland Park, KS (US)

(72) Inventors: Joao Teixeira, Shawnee, KS (US); Willie Dorance King, Austin, TX (US); Marouane Balmakhtar, Fairfax, VA (US); Robert Butler, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 29 days.

(21) Appl. No.: 18/338,579

(22) Filed: Jun. 21, 2023

(65) Prior Publication Data
US 2024/0428665 A1    Dec. 26, 2024

(51) Int. Cl.
G08B 6/00    (2006.01)

(52) U.S. Cl.
CPC ..................................... G08B 6/00 (2013.01)

(58) Field of Classification Search
None
See application file for complete search history.

(56) References Cited

U.S. PATENT DOCUMENTS

| | | | | |
|---|---|---|---|---|
| 9,754,464 | B1* | 9/2017 | Sinkov | G06F 1/163 |
| 11,054,906 | B2* | 7/2021 | Bench | H04W 4/80 |
| 2010/0332224 | A1* | 12/2010 | Makela | G10L 13/00 |
| | | | | 704/E13.011 |
| 2015/0314681 | A1* | 11/2015 | Riley, Sr. | A61B 5/7455 |
| | | | | 340/576 |
| 2017/0206755 | A1* | 7/2017 | Levesque | H04N 21/4348 |
| 2020/0142493 | A1* | 5/2020 | Bench | H04L 63/083 |
| 2022/0282985 | A1* | 9/2022 | Amariei | G01C 21/3608 |
| 2023/0341941 | A1* | 10/2023 | Clark | A63F 13/533 |

OTHER PUBLICATIONS

Surasinghe et al., An Efficient Knock Code Decoding Approach to assist the People with Communication Impairments, Jun. 12, 2023, IEEE, Electronic ISBN:979-8-3503-4737-1, Print on Demand(PoD) ISBN:979-8-3503-4738-8, pp. 197 (Year: 2023).*

* cited by examiner

Primary Examiner — Carlos Garcia
(74) Attorney, Agent, or Firm — Jones Robb, PLLC (57) ABSTRACT

Systems, methods and devices are provided for facilitating integration of haptic notifications with existing applications, particularly mobile applications. A method includes accessing, by a wireless device storing an application, a haptic notification library including haptic notifications and further accessing code correlating the haptic notifications from the haptic notification library with standard notifications within the application. The method further includes providing the correlated haptic notifications during execution of the application by the wireless device.

20 Claims, 6 Drawing Sheets

HAPTIC NOTIFICATION SYSTEM AND METHOD

TECHNICAL BACKGROUND

A wireless network, such as a cellular network, can include an access node (e.g., base station) serving multiple wireless devices or user equipment (UE) in a geographical area covered by a radio frequency transmission provided by the access node. Access nodes may deploy different carriers within the cellular network utilizing different types of radio access technologies (RATs). RATs can include, for example, 3G RATs (e.g., GSM, CDMA etc.), 4G RATs (e.g., WiMax, LTE, etc.), and 5G RATs (new radio (NR)). RATS may additionally include, for example, Wi-Fi and Bluetooth. Additionally, different standards may be implemented, including one or more International Engineering Task Force (IETF) standards; one or more of the Institute of Electrical and Electronics Engineers (IEEE) 802.11 standards; and/or any other industry standards and/or specifications. Further, different types of access nodes may be implemented for deployment for the various RATs. For example, an evolved NodeB (eNodeB or eNB) may be utilized for 4G RATs and a next generation NodeB (gNodeB or gNB) may be utilized for 5G RATs. Deployment of the evolving RATs in a network provides numerous benefits. For example, newer RATs may provide additional resources to subscribers, faster communications speeds, and other advantages. For example, 5G networks provide edge deployments enabling computing capabilities closer to UEs. However, increased interference and latencies may be created due to higher power capabilities of 5G devices.

Wireless devices or UEs offer the capability to use mobile applications (apps) to device users to leverage the above-described technologies. Increasingly, apps have evolved to include accessibility features to accommodate deaf and/or blind users. Technological advancements provided by mobile apps can improve quality of life for the deaf and blind. The deaf are unable to listen to auditory notifications such as horns, sirens, or public announcements while navigating through traffic or while walking through public places such as airports, train stations, bus stations, hospitals, or stores. The deaf also have problems with communication in establishments such as restaurants or bars. Additionally, the blind struggle with mobility and are more prone to injury when walking or crossing roads. Mobile apps offer portable assistive technologies to help those with disabilities perform daily tasks and can be tailored to a particular disability. Currently available apps for the deaf often provide speech to text conversions, while available apps for the blind provide the reverse.

Improvements are needed to develop universal assistive technologies to assist the blind and deaf as well as fully able individuals in the performance of daily tasks when users of wireless devices may already have their sight and hearing committed in the performance of the tasks.

Overview

Exemplary embodiments described herein include systems and methods for optimizing the wireless device experience through the provision of haptic notifications. A method includes accessing by a wireless device storing an application, a haptic notification library including haptic notifications and code correlating the haptic notifications from the haptic notification library with standard notifications within the application. The method additionally includes providing the correlated haptic notifications during execution of the application by the wireless device.

A further exemplary embodiment includes a haptic notification system having a haptic notification library storing multiple haptic notifications for correlation with standard notifications. The system further includes a wireless device having a processor executing code correlating haptic notifications from the haptic notification library with standard notifications within an application. The wireless device additionally includes an output interface providing the correlated haptic notifications during execution of the application by the wireless device.

An additional exemplary embodiment includes a method for generating haptic notifications. The method includes providing a haptic notification library for use by multiple applications and storing correlation logic for correlating haptic notifications from the haptic notification library with standard notifications from an application. The method additionally includes downloading the haptic notifications and correlation logic from the haptic notification library to a wireless device executing the application.

DETAILED DESCRIPTION

Exemplary embodiments described herein include systems, methods, and devices for providing haptic notifications through applications running on a wireless device. The applications may be or include any applications that provide notifications. For example, a navigation application provides notifications indicating distance, left turns, and right turns. As another example, an airline application may provide notifications for flight delays, flight cancellations, and flight departures. As yet a further example, a teaching application may provide notifications for right answers, wrong answers, and passing or failing. In yet a further example, banking applications may provide fraud notifications, deposit notifications, or withdrawal notifications. Gaming applications may also provide notifications pertaining to progress, winning, and losing the game. In standard versions of the above-identified applications, the notifications may be provided audibly or visually. In embodiments provided herein, a haptic notification system is provided that enables haptic notifications for applications executed by a wireless device.

A method includes providing a haptic notification system for use by multiple applications. The haptic notification system may be stored, for example, in the cloud, or in a core network, RAN, or a wireless device. The haptic notification system may include a haptic notification library storing multiple types of haptic notifications and correlation logic for correlating haptic notifications from the haptic notification library with standard notifications from an application. In embodiments provided herein, wireless devices may download the haptic notifications and the correlation logic from a remote location for use with applications running on the wireless device.

The stored haptic notifications may include multiple sets of haptic notifications having different formats. The haptic notifications may be delivered through an electric motor of the wireless device that causes the wireless device to vibrate in accordance with a format dictated by the stored haptic notifications. For example, one set of haptic notifications may include Morse Code notifications. The Morse code notifications may include, for example, a short mark, which is one time unit long, and a long mark, which is three time units long. Further, Morse Code includes three different gap lengths that can be used between the short and long marks. The correlation logic may, for example, correlate one combination of short marks and long marks with a left turn and another combination of short marks and long mark with a right turn. The correlation logic may further correlate an intensity of the vibration with a distance to the turn. In exemplary embodiments, the correlation logic may determine a number of standard notifications required in an application running on the wireless device and match a haptic notification to each of the standard notifications. Thus, multiple different lengths and intensities may be provided for the haptic notifications.

While existing applications may use vibration and sound as notifications to wireless device users, all notifications feel and sound the same, and thus users often are still required to look at the wireless device in order to understand the notification. For example, in a navigation application, the notifications may cause the wireless device to vibrate for an upcoming turn, but the vibration would be exactly the same for a left turn and for a right turn, thus forcing the user, particularly a deaf or hard of hearing user, to look at the wireless device for accurate instruction. Accordingly, embodiments provided herein use Morse Code or other coding systems to standardize and differentiate the types of notifications. The Morse Code notifications are overlayed with intensity of the vibrations to create a unique user experience.

By providing a haptic notification using a Morse Code enhancement, the navigation application may provide voice over notifications along with differentiated haptic vibration notifications to inform the navigator of a precise next action. With differentiated vibration notifications, the user would not rely on the standard voice notifications and would know which action to take without looking at the wireless device. The differentiated vibration notifications provide a standardized enhanced experience to all users, so that even deaf or hard of hearing users do not need to look at the device to determine an appropriate action.

In embodiments provided herein, the haptic notification library may reside on the wireless device or may reside on the cloud or at the core network and be downloadable to the wireless device. For example, wireless devices could be configured to periodically download the haptic notification library or portions of the haptic notification library from a remote server. Alternatively, the remote server could be configured to push haptic library notifications and updates to the wireless device. The provision of differentiated haptic notifications provides a unique experience for all users and introduces an accessibility feature to all wireless device applications currently offering standard notifications. Through the use of systems, methods, and devices described herein, existing notification systems within mobile applications are customized and improved to offer accessibility features.

In addition to the systems and methods described herein, the methods and systems for providing haptic notifications may be implemented as computer-readable instructions or methods, and processing nodes on the network for executing the instructions or methods. The processing node may include a processor included in the access node or a processor included in any controller node in the wireless network that is coupled to the access node.

Figure 1:
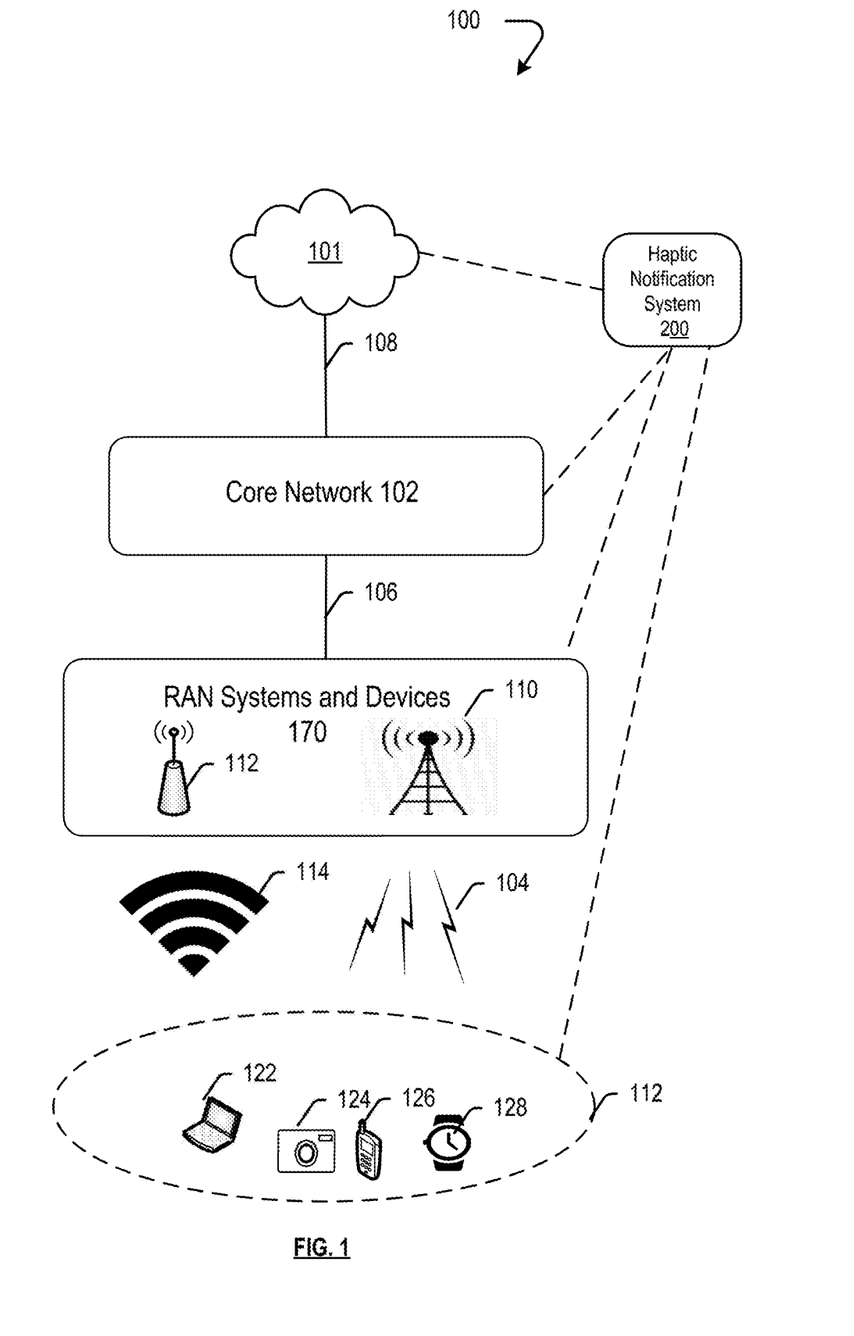
FIG. 1 depicts an exemplary operating environment for employing a haptic notification system in accordance with the disclosed embodiments.

FIG. 1 depicts an exemplary system 100 for wireless communication, in accordance with the disclosed embodiments. The system 100 may include a communication network 101, core network 102, and a radio access network (RAN) 170 including at least one access node 110. The RAN 170 may include other devices, such as wireless access point 112, and additional access nodes. The system 100 also includes multiple wireless devices 122, 124, 126, and 128, which may be end-user wireless devices and may operate within one or more coverage areas 112 and communicate with the RAN 170 over communication links 104, which may for example be 5G NR communication links. The wireless devices may further include, for example, embedded subscriber identity module (eSIM) chips, tablets, Internet of Things (IoT) devices, and home internet (HINT) devices providing Wi-Fi to other wireless devices. These examples are merely illustrative and are not intended to be limiting. Communication links 104 may additionally include, for example, 4G LTE, 5GNR communication links, or any other suitable type of communication link. The wireless access point 112 may provide a Wi-Fi network 114 to the wireless devices 122, 124, 126, 128.

The system 100 may further include a haptic notification system 200, which is illustrated as being optionally located in the cloud 101, the core network 102, the RAN 170, which may provide the Wi-Fi network 114 for the wireless devices 122, 124, 126, 128, or on wireless devices 122, 124, 26, 128. However, it should be noted that the haptic notification system 200 may be distributed. For example, the haptic notification system 200 may utilize components located at the cloud 101, the core network 102, at multiple access nodes 110 and at the wireless devices 122, 124, 126, 128.

The haptic notification system 200 stores sets of haptic notifications in a haptic notification library for use by the wireless devices 122, 124, 126, 128. The haptic notification system 200 further stores correlation logic for correlating the haptic notifications with standard notifications provided by mobile applications operating on the wireless devices 122, 124, 126, 128. Ultimately, the wireless devices 122, 124, 126, 128 provide haptic notifications through vibrations when running mobile applications in addition to the standard notifications, which are audible and/or visible, provided through the mobile applications.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124, 126, 128. Wireless network protocols can comprise Multimedia Broadcast Multicast Services (MBMS), code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The core network 102 includes core network functions and elements. The core network may be, for example, a 4G network and may have an evolved packet core (EPC) structure or may be a 5G network structured using a service-based architecture (SBA). Various architectures including standalone (SA) and non-standalone (NSA) may be implemented. The network functions and elements may be separated into user plane functions and control plane functions. In an SBA architecture, service-based interfaces may be utilized between control-plane functions, while user-plane functions connect over point-to-point link. The user plane function (UPF) accesses a data network, such as network 101, and performs operations such as packet routing and forwarding, packet inspection, policy enforcement for the user plane, quality of service (QOS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 122, 124, 126, 128 and is responsible for handling connection and mobility management tasks. The SMF is primarily responsible for creating updating and removing sessions and managing session context. The UDM function provides services to other core functions, such as the AMF, SMF, and NEF. The UDM function may function as a stateful message store, holding information in local memory. The NSSF can be used by the AMF to assist with the selection of network slice instances that will serve a particular device. Further, the NEF provides a mechanism for securely exposing services and features of the core network.

Communication links 106 and 108 can use various communication media, such as air, space, metal, optical fiber, or some other signal propagation path-including combinations thereof. Communication links 106 and 108 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Other wireless protocols can also be used. Communication links 106 and 108 can be direct links or might include various equipment, intermediate components, systems, and networks, such as a cell site router, etc. Communication links 106 and 108 may comprise many different signals sharing the same link. Communication links 106 and 108 may be associated with many different reference points.

The RAN 170 may include various access network systems and devices such as access node 110. The RAN 170 is disposed between the core network 102 and the end-user wireless devices 122, 124, 126, 128. Components of the RAN 170 may communicate directly with the core network 102 and others may communicate directly with the end user wireless devices 122, 124, 126, 128. The RAN 170 may provide services from the core network 102 to the end-user wireless devices 122, 124, 126, and 128.

The RAN 170 includes at least an access node (or base station) 110, such as an eNodeB, a next generation NodeB (gNodeB) 110 communicating with the plurality of end-user wireless devices 122, 124, 126, 128. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access nodes 110 can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. In additional embodiments, access nodes may comprise two co-located cells, or antenna/transceiver combinations that are mounted on the same structure. Alternatively, access nodes 110 may comprise a short range, low power, small-cell access node such as a microcell access node, a picocell access node, a femtocell access node, or a home eNodeB device. As will be further described below, functionality for tagging requests from wireless devices may be included within the access nodes. Access nodes 110 can be configured to deploy one or more different carriers, utilizing one or more RATs. For example, a gNodeB may support NR and an eNodeB may provide LTE coverage. Any other combination of access nodes and carriers deployed therefrom may be evident to those having ordinary skill in the art in light of this disclosure.

The access nodes 110 can comprise a processor and associated circuitry to execute or direct the execution of computer-readable instructions to perform operations such as those further described herein for providing haptic notifications to wireless devices 122, 124, 126, 128. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node. In embodiments disclosed herein, the wireless devices 122, 124, 126, and 128 may download components from the haptic notification system 200 in order to provide customized notifications through apps stored on the wireless devices 122, 124, 126, 128. Alternatively, the haptic notification system 200 may be provided as a native application on the wireless device 122, 124, 126, 128.

Wireless devices 122, 124, 126, and 128 may be any device, system, combination of devices, or other such communication platform capable of communicating wirelessly with access network 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can send and receive audio or data. The wireless devices 122, 124, 126 128 may be or include high power wireless devices or standard power wireless devices. Further, the wireless devices may include wearable devices such as watches or other wearable devices capable of wireless communications.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork (including the Internet). Communication system 100 may be capable of communicating signals and carrying data, for example, to support voice, push-to-talk, broadcast video, and data communications by end-user wireless devices 122, 124, 126, and 128. Wireless network protocols may include one or more of MBMS, code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for facilitating delivery of haptic notifications from wireless devices utilizing mobile applications may be implemented as computer-readable instructions or methods, and processing nodes on the network for executing the instructions or methods. The processing node may include a processor included in the access node or a processor included in any controller node in the wireless network that is coupled to the access node.

Figure 2:
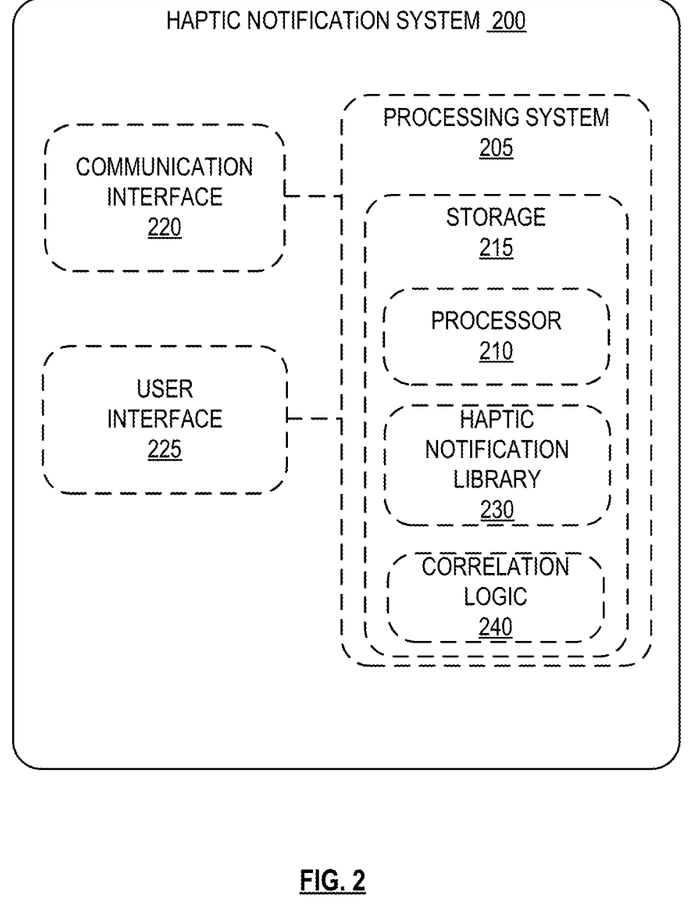
FIG. 2 illustrates an exemplary haptic notification system in accordance with disclosed embodiments.

FIG. 2 depicts a haptic notification system 200, which may be configured to perform the methods and operations disclosed herein to provide customized haptic notifications from wireless devices 122, 124, 126, 128, using mobile applications. In the disclosed embodiments, haptic notification system 200 may be integrated with the access node 110, the core network 102, the RAN 170, the wireless devices 122, 124, 126, 128, or may be an entirely separate component capable of communicating with the wireless devices 122, 124, 126, 128.

The haptic notification system 200 may be configured for storing haptic notifications and logic for implementation by wireless devices 122, 124, 126, 128. In embodiments disclosed herein the haptic notification system 200 may include a processing system 205. Processing system 205 may include a processor 210 and a storage device 215. Storage device 215 may include a disk drive, a flash drive, a memory, or other storage device configured to store data and/or computer readable instructions or codes (e.g., software). The computer executable instructions or codes may be accessed and executed by processor 210 to perform various methods disclosed herein. Software stored in storage device 215 may include computer programs, firmware, or other form of machine-readable instructions, including an operating system, utilities, drivers, network interfaces, applications, or other type of software. For example, software stored in storage device 215 may include a module for performing various operations described herein. For example, instructions may be provided to download haptic notifications and correlation logic in response to wireless device requests. Thus, the storage device 215 may store intelligence including a haptic notification library 230 and correlation logic 240. Processor 210 may be a microprocessor and may include hardware circuitry and/or embedded codes configured to retrieve and execute software stored in storage.

The haptic notification library 230 may include multiple sets of haptic notification schemes. For example, the haptic notification library 230 may include Morse code haptic notifications that encode the 26 letters of the alphabet. Each Morse code symbol, or each letter of the alphabet, is formed by a sequence of "dits", represented by ".", and "dahs", represented by "-". The dit (".") duration is the basic unit of time measurement in Morse code transmission. The duration of a dah "-" is three times the duration of a dit ".". Each dit or dah within an encoded character is followed by a period of signal absence, called a space, equal to the dit duration. The letters of a word are separated by a space of duration equal to three dits, and words are separated by a space equal to seven dits.

Another alternative set of haptic notifications in the haptic notification library 230 may include tap code notifications. The tap code, sometimes called the knock code, is a way to encode text messages on a letter-by-letter basis. While the tap code is traditionally transmitted using a series of tap sounds, notifications provided herein could include vibrations rather than tap sounds. The tap code is based on a Polybius square using a 5×5 grid of letters representing all the letters of the Latin alphabet, except for K, which is represented by C. Each letter is communicated by tapping two numbers, the first designating the row and the second (after a pause) designating the column. For example, to specify the letter "B", one taps is followed by a pause and two taps. The notification recipient discriminates the timing of the vibrations to isolate the letters.

While Morse code and tap code are provided as examples, other schemes for haptic notification libraries may also be implemented. In some embodiments, mobile device users are able to select from the multiple sets of haptic notifications within the haptic notification library 230.

In operation, the correlation logic 240 may cause standard notifications within mobile apps to be abbreviated in order to create haptic notifications. For example, in a navigation application, a right turn may be represented by an "R" and a left turn may be represented by and "L" In an airline application, a delay may be represented by a "D". Boarding may be represented by a "B" and so on. Accordingly, the correlation logic 240 may be provided to make these associations. The correlation logic 240 and one or more sets of haptic notifications from the haptic notification library 230 may be accessible by mobile devices 122, 124, 126, 128, for example over the Internet, and may be downloaded on the mobile device for execution in conjunction with multiple mobile applications. As a further option, the haptic notification library 230 and the correlation logic 240 may be provided as a native feature on mobile devices 122, 124, 168, 128.

The haptic notification system 200 may include a communication interface 220 and a user interface 225. Communication interface 220 may be configured to enable the processing system 205 to communicate with other components, nodes, or devices in the wireless network. For example, haptic notification system 200 can share intelligence including the haptic notification library 230 and correlation logic 240 with wireless devices 122, 124, 126, 128.

Communication interface 220 may include hardware components, such as network communication ports, devices, routers, wires, antenna, transceivers, etc. User interface 225 may be configured to allow a user to provide input to the haptic notification system 200 and receive data or information from the haptic notification system 200. User interface 225 may include hardware components, such as touch screens, buttons, displays, speakers, etc. The haptic notification system 200 may further include other components such as a power management unit, a control interface unit, etc.

The haptic notification system 200 thus may utilize the memory 215 and the processor 210 to perform multiple operations. For example, the processor 210 may access stored instructions in the memory 215 to determine if the wireless device is using a particular application, and execute the correlation logic 240 to provide a set of haptic notifications corresponding to the standard notifications for that application.

The location of the haptic notification system 200 may depend upon the network architecture. For example, in smaller networks, a single haptic notification system 200 may be disposed for communication with the wireless devices 122, 124, 126, 128. However, in a larger network, multiple haptic notification systems 200 may be required to cover the network. Additionally, as set forth above, the haptic notification library 230 and correlation logic 240 may be provided as native features on wireless devices. As an additional option, the functions of the haptic notification system 200 may be split to operate in different locations within the network.

Figure 3:
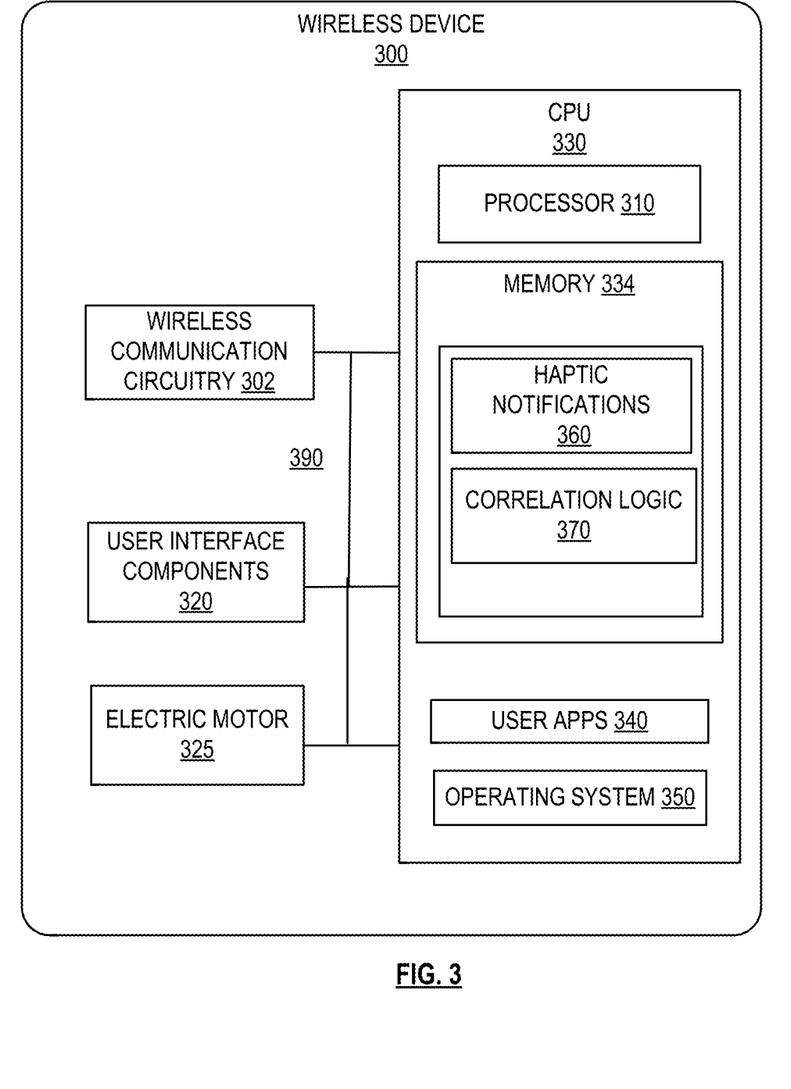
FIG. 3 illustrates an exemplary configuration for a wireless device implementing a haptic notification library in accordance with disclosed embodiments.

FIG. 3 depicts an exemplary wireless device or UE 300 in accordance with disclosed embodiments. The wireless device 300 may correspond to one of wireless devices 122, 124, 126, 128 in FIG. 1. As illustrated, the wireless device 300 includes wireless communication circuitry 302, user interface components 320, an electric motor 325, a central processing unit (CPU) 330, processor 310, memory 334, user apps 340, and operating system 350. Components may be connected, for example, by a bus 390. These components are merely exemplary and the wireless device 300 may include a larger or smaller number of components capable of performing the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The memory 334 may store, for example, haptic notifications 360 and correlation logic 370. The haptic notifications 360 may be or include the entire haptic notification library 230 described above with respect to FIG. 2. Alternatively, the haptic notifications 360 may be a subset of the haptic notification library 230. For example, a wireless device user may download only the Morse code haptic notifications from the haptic notification library 230.

Similarly, the correlation logic 370 may be the same as the correlation logic 240. Alternatively, the correlation logic 370 may be a subset of the correlation logic applicable only to the downloaded notifications from the haptic notification library 230. When executed by the processor 310, the correlation logic 370 interacts with a selected user app 340 and the haptic notifications 360 to assist with the methods described herein.

Further, in embodiments disclosed herein, the wireless device 300 includes the electric motor 325 for causing vibrations to occur based on the haptic notifications generated. In embodiments provided herein, the motor may, for example, be a small electric motor having an axis mounting a metal cylinder. The axis of the motor may be configured to be different from the axis of the cylinder. Thus, the cylinder vibrates during rotation. Other methods for creating vibrations are within scope of the disclosure.

The wireless communication circuitry 302 may include circuit elements configured to generate wireless signals (e.g., one or more antennas) as well as interface elements configured, for example, to translate control signals from the CPU 330 into data signals for wireless output. Further, the wireless communication circuitry 302 may include multiple elements, for example to communicate in different modes with different RATs. The CPU 330 may be configured to receive, interpret, and/or respond to signals received via the wireless communication circuitry 302. The CPU 330 may be configured to receive a network command (e.g., from an access node 110 or from the haptic communication system 200) to perform other specified functions. The user interface components 320 may be or include any components enabling a user to interact with the wireless device 300.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

Figure 4:
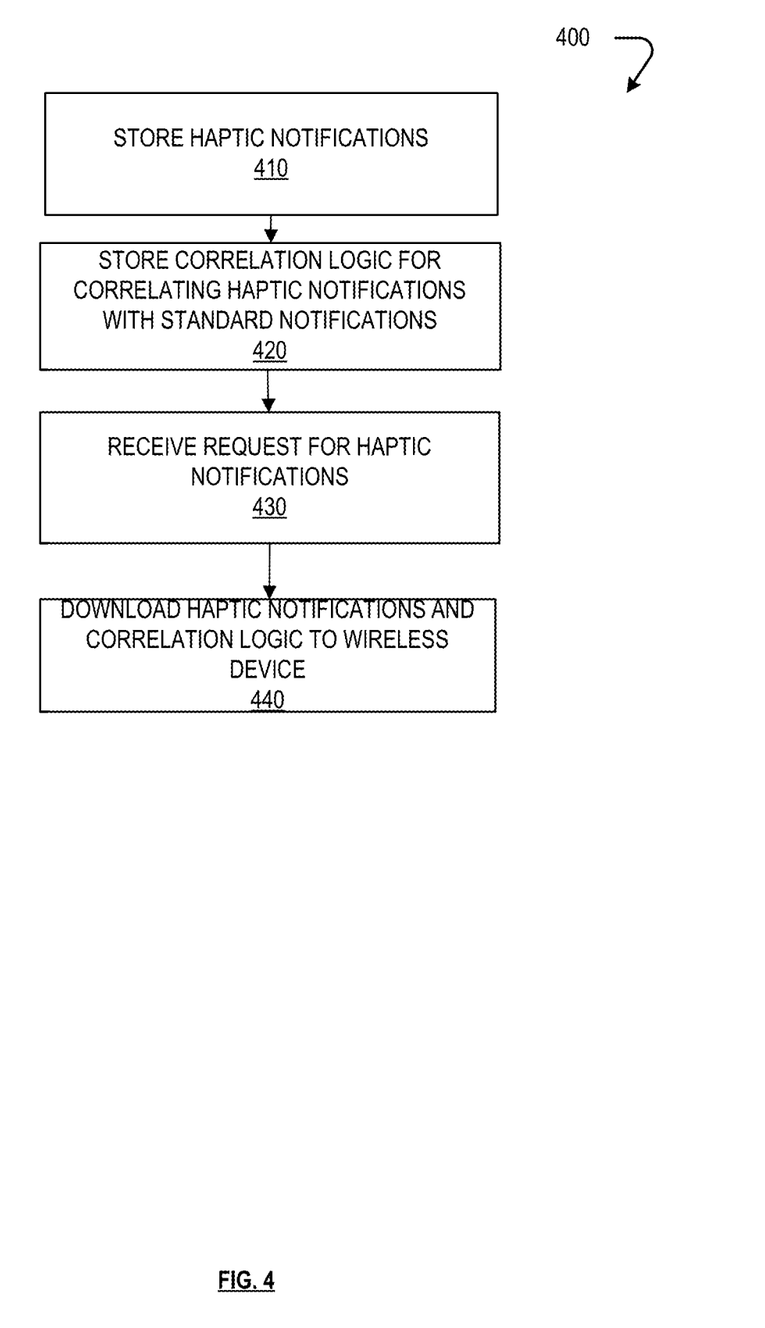
FIG. 4 depicts an exemplary method for utilizing a haptic notification library in accordance with disclosed embodiments.

The disclosed methods for providing haptic notifications are discussed further below with respect to FIGS. 4-6. FIG. 4 illustrates an exemplary method 400 for providing haptic notifications to a wireless device in accordance with embodiments disclosed herein. Method 400 may be performed by any suitable processor discussed herein, for example, a processor 210 included in the haptic notification system 200. For discussion purposes, as an example, method 400 is described as being performed by the processor 210 of the haptic notification system 200.

Method 400 begins in step 410, when the haptic notification system 200 stores haptic notifications in the haptic notification library 230. For example, as set forth above, the notifications may include Morse code notifications, tap notifications, and any other type of notifications appropriate for haptic transmission.

Further, in step 420, the processor 210 stores correlation logic for correlating haptic notifications with standard notifications that may be found in mobile applications. For example, a fraud notification from a mobile banking application may be represented by an "F". A left turn from a navigation application may be represented by an "L". A right turn from a navigation application may be represented by an "R". The correlation logic 240 may include instructions for sorting through all of the notifications in a mobile application and cause them to be abbreviated or otherwise rendered appropriate for haptic representation.

Further, in step 430, the haptic notification system 200 receives a request for haptic notifications, for example, from the wireless device 300. The wireless device 300 may transmit the request for a particular mobile applications or for all mobile applications. In some embodiments the request may include a particular set of haptic notifications and in other embodiments, the request may include a single set of haptic notifications, such as Morse code notifications.

In step 440, the haptic notification system 200 downloads the requested haptic notifications 230 and correlation logic 240 to the wireless device 300. The haptic notification system 200 may be accessible to the wireless devices over the Internet. Alternatively, the haptic notification system 200 may be stored in the RAN 170 or in the core network 102 for more immediate downloading to the wireless device 122, 124, 126, 128.

Figure 5:
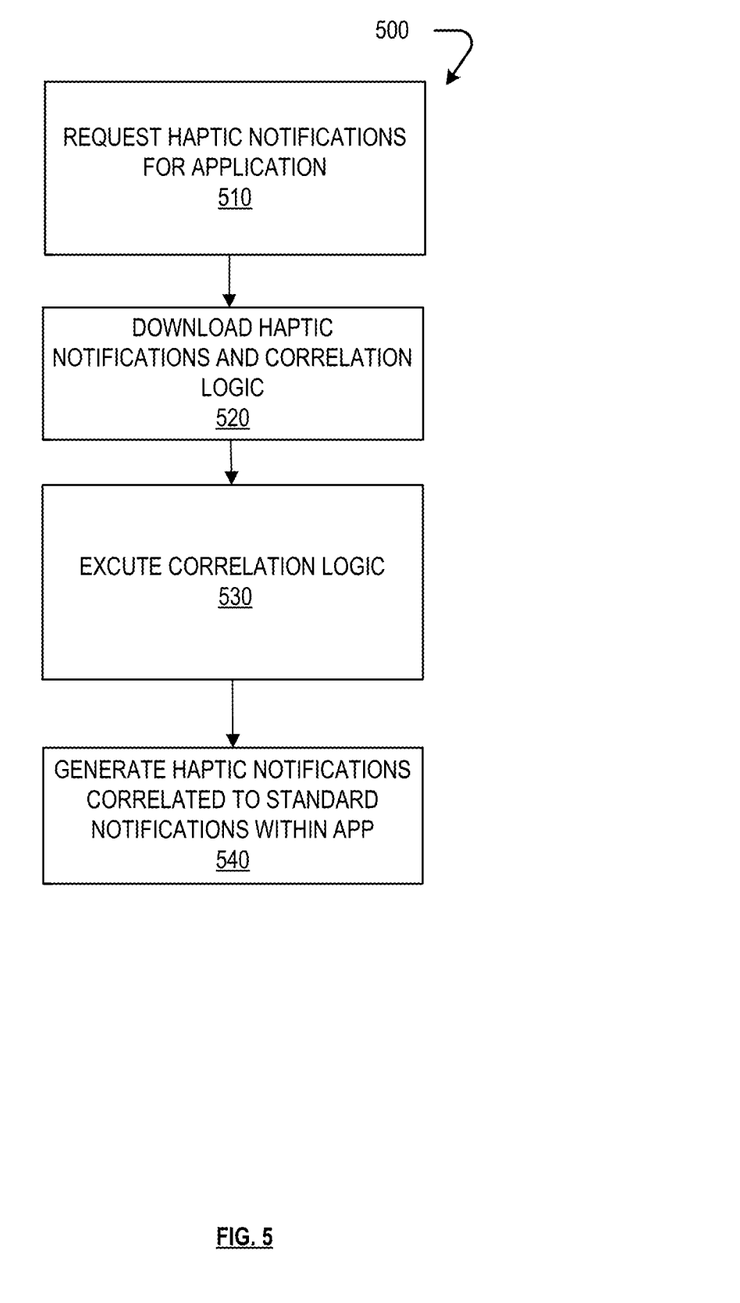
FIG. 5 depicts an exemplary haptic notification method performed by a wireless device in accordance with the disclosed embodiments.

FIG. 5 illustrates a method 500 performed by a wireless device 300 to receive haptic notification capabilities. Method 500 may be performed by any suitable processor discussed herein, for example, a processor 310 included in the wireless device 300. For discussion purposes, as an example, method 500 is described as being performed by the processor 310.

In step 510, the processor 310 causes a request for haptic notifications 230 to be transmitted to the haptic notification system 200. The request may be transmitted for a specific application, such as a navigation application, a banking application or an airlines application. Alternatively, the request may be executed for all mobile applications stored on the wireless device 300.

In step 520, the processor 310 causes the haptic notifications 360 and correlation logic 370 to be downloaded to the wireless device 300. As explained above, the wireless device 300 may download the entire haptic notification library 230 or a subset of the haptic notification library 230. Further, the wireless device 300 may download all of the correlation logic 240 or a portion of that correlation logic application to the downloaded subset of the haptic notification library 230.

In step 530, the processor 310 of the wireless device 300 executes the correlation logic 370 to correlate standard notifications with a haptic notification. For example, the correlation logic 370 may abbreviate each standard notification to translate to a unique haptic notification so that no haptic notifications are repeated for distinct standard notifications.

Finally, in step 540, the processor 310 causes haptic notifications to be generated within a mobile application. Accordingly, a haptic notification is generated through use of the processor 310 directing the electric motor 325 to generate a haptic notification corresponding to the standard notification. For example, in a navigation application requiring a right turn, the correlation logic 370 associates the standard notification "Right Turn" with a haptic notification "R". If the stored haptic notifications 360 correspond to Morse Code, then the processor 310 directs the electric motor 325 to generate a haptic notification corresponding to a representation of "R" in Morse Code. Thus, in accordance with the current International Morse Code standard, a right turn would be represented by ".-." and a left turn would be represented by ".-.." Accordingly, a first haptic notification for right turn includes a first set of vibrations and a second haptic notification for a left turn includes a second set of vibrations.

Further, the processor 310 may direct the electric motor 325 to generate haptic notifications with different intensities. For example, if the right turn is less than or equal to a predetermined threshold distance away, the electric motor 325 may generate a high intensity vibration and if the right turn is greater than the predetermined threshold distance away, the processor 310 may direct the electric motor 325 to generate a low intensity vibration. As an alternative, the processor 310 may cause the electric motor 325 to generate vibrations on a graduated scale of intensity based on the distance to the turn. Thus, the intensity may be graduated, but could be also "adapted" intensity which could move in either direction. For example, the intensity may start with a lower level and gradually increase, or start with high level and gradually decrease, or may fluctuate, for example, going higher then lower.

Figure 6:
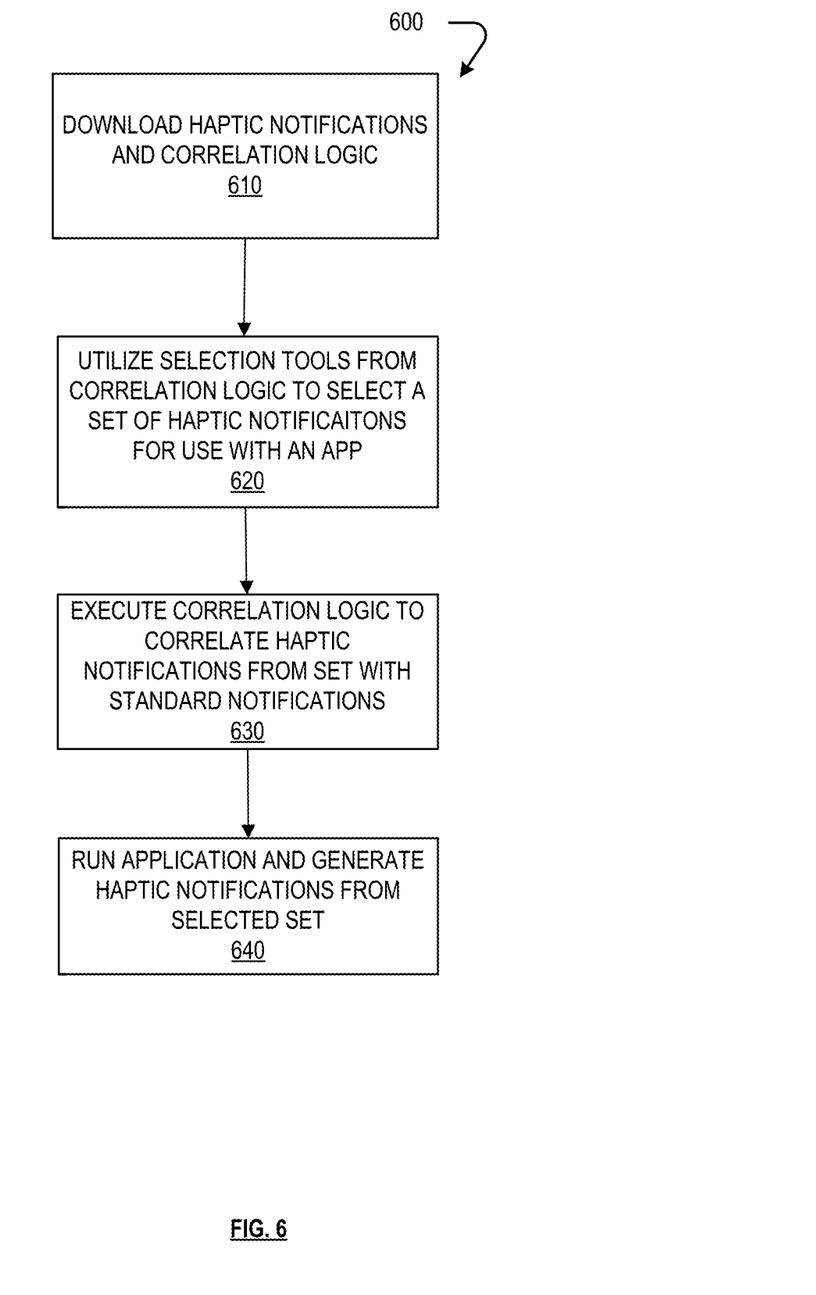
FIG. 6 depicts a further exemplary haptic notification method performed by a wireless device in accordance with disclosed embodiments.

FIG. 6 illustrates a method 600 for generating haptic notifications from a wireless device 300. The method 300 may be performed by any suitable processor such as, for example, the processor 310 of the wireless device 300. For the sake of illustration, the method 600 is described as being performed by the processor 310.

In step 610, the processor 310 causes the haptic notifications from the haptic notification library 230 and the correlation logic 240 to be downloaded from the haptic notification system 200. If the haptic notifications 360 and the correlation logic 370 are native to the wireless device 300, this step may be omitted.

In step 620, the processor 310 may utilize selection tools provided in the correlation logic 240 to select a set of haptic notifications 360 for use with a particular mobile application or with all mobile applications. For example, the processor 310 may cause the entire haptic notification library 230 to be downloaded, but may allow selection of a particular set of haptic notifications, such as Morse Code notification or tap notifications. Further, the user may select any application for use with the haptic notification library.

In step 630, the processor 310 may execute the correlation logic 370 to correlate haptic notifications 360 from the selected set with standard notifications from the mobile application. As described above, the correlation logic 370 may cause the standard notifications to be abbreviated prior to correlating them with specific haptic notifications. In step 640 the processor 310 runs the mobile application and generates haptic notifications from selected set by communicating with the electric motor 325 as described above with respect to FIG. 5.

In some embodiments, methods 400, 500, and 600 may include additional or fewer steps or operations. Furthermore, the methods may include steps shown in each of the other methods. As one of ordinary skill in the art would understand, the methods 400, 500, and 600 may be integrated in any useful manner. Further, the order of the steps shown is merely exemplary and the order of steps may be rearranged in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   executing an application by a wireless device;
   accessing, by the wireless device executing the application, a haptic notification library including haptic notifications and code comprising a correlation logic;
   abbreviating a set of standard notifications within the application;
   correlating the haptic notifications from the haptic notification library with the abbreviated set of standard notifications within the application, the haptic notification library further including multiple selectable sets of haptic notifications; and
   providing the correlated haptic notifications from a selected set of haptic notifications; and
   causing the correlated haptic notifications to be generated within the application.

2. The method of claim 1, further comprising providing the haptic notifications as vibrations.

3. The method of claim 2, further comprising providing the haptic notifications to include different numbers of vibrations.

4. The method of claim 2, further comprising providing the haptic notifications including different durations of vibrations.

5. The method of claim 2, further comprising providing the haptic notifications to include different intensities of vibrations.

6. The method of claim 1, further comprising providing the multiple selectable sets of haptic notifications to include at least a set of Morse Code notifications and a set of tap notifications.

7. The method of claim 1, wherein the standard notifications include visual notifications.

8. The method of claim 1, wherein the standard notifications include audible notifications.

9. The method of claim 1, wherein the application is a navigation application having standard notifications for left turns and right turns.

10. The method of claim 9, further comprising correlating the right turns with a first haptic notification and correlating the left turns with a second haptic notification.

11. The method of claim 10, further comprising correlating an intense vibration with right turns and left turns occurring within a predetermined distance threshold and correlating a less intense vibration with left turns and right turns not occurring within the predetermined distance threshold.

12. The method of claim 10, further comprising providing a graduated intensity of vibration for right turns and left turns based on a proximity of the right turns and left turns.

13. The method of claim 1, wherein the application is selectable by the wireless device user.

14. A method comprising:
   providing a haptic notification library for use by multiple applications, the haptic notification library including multiple selectable sets of haptic notifications;
   storing correlation logic for:
      abbreviating a set of standard notifications from an application executed on a wireless device;
      correlating haptic notifications from the haptic notification library with the abbreviated set of standard notifications from the application executed on the wireless device; and
      downloading at least a selected set of the haptic notifications and the correlation logic from the haptic notification library to the wireless device executing the application.

15. The method of claim 14, further comprising executing the correlation logic at the wireless device.

16. The method of claim 14, wherein one of the applications is a navigation application having standard notifications for left turns and right turns.

17. The method of claim 16, further comprising executing the correlation logic to correlate the right turns with a first set of vibrations and the left turns with a second set of vibrations.

18. A haptic notification system comprising:
   a haptic notification library storing multiple haptic notifications for correlation with standard notifications, the haptic notification library further including multiple selectable sets of haptic notifications; and
   a mobile phone comprising;
      a processor executing code comprising a correlation logic correlating haptic notifications from the haptic notification library with standard notifications within a mobile phone application; and
      an output interface providing the correlated haptic notifications from a selected set of haptic notifications during execution of the mobile phone application by the mobile phone.

19. The haptic notification system of claim 18, wherein the processor is further configured to execute code abbreviating a set of standard notifications and correlating haptic notifications from the haptic notification library with the abbreviated set of standard notifications within the mobile phone application.

20. The haptic notification system of claim 19, wherein the mobile phone application is a navigation application having standard notifications for left turns and right turns.

* * * * *